(12) United States Patent
Jung et al.

(10) Patent No.: US 6,716,369 B1
(45) Date of Patent: Apr. 6, 2004

(54) PREPARING GREEN PHOSPHOR BASED ON ZINC ORTHOSILICATE

(75) Inventors: Ha-Kyun Jung, Daejeon (KR); Bu Young Sung, Daejeon (KR); Hee Dong Park, Daejeon (KR)

(73) Assignee: Korea Research Institute of Chemical Technology, Daejon (KR)

( * ) Notice: Subject to any disclaimer, the term of this patent is extended or adjusted under 35 U.S.C. 154(b) by 0 days.

(21) Appl. No.: 09/979,314

(22) PCT Filed: May 19, 2000

(86) PCT No.: PCT/KR00/00497

§ 371 (c)(1),
(2), (4) Date: Feb. 20, 2002

(87) PCT Pub. No.: WO00/71636

PCT Pub. Date: Nov. 30, 2000

(30) Foreign Application Priority Data

May 25, 1999 (KR) .......................................... 1999-18916

(51) Int. Cl.[7] ........................... C09K 11/54; C09K 11/59
(52) U.S. Cl. ................................................. 252/301.4 F
(58) Field of Search .................................... 252/301.6 F

(56) References Cited

U.S. PATENT DOCUMENTS 2,314,699 A * 3/1943 Hale ..................... 252/301.6 F
3,541,019 A * 11/1970 Glemza et al. ........ 252/301.6 F
5,985,176 A * 11/1999 Rao ..................... 252/301.6 F

FOREIGN PATENT DOCUMENTS

WO     WO93/25630     12/1993

* cited by examiner

Primary Examiner—C. Melissa Koslow
(74) Attorney, Agent, or Firm—Finnegan, Henderson, Farabow, Garrett & Dunner, L.L.P.

(57) ABSTRACT

This invention relates to a process for preparing a spherical green-emitting phosphor based on zinc orthosilicate and more particularly, to the process for a zinc orthosilicate-based green-emitting phosphor demonstrating an emission spectrum at visible regions, when excited by electron beam, via a new application of 'the homogeneous precipitation method' comprising the following steps such as i) a solution of tetraethylorthosilicate (TEOS) diluted in ethanol is hydrolyzed to obtain a hydrated silica, ii) said hydrated silica is dispersed together with the solution containing zinc and manganese components, iii) a precipitant selected from oxalic acid and oxalates is added to said dispersed solution together with a basic solution, while precipitating zinc and manganese components, iv) said admixture precipitate, so filtered off and dried, is calcined in the air and reheated under the reducing atmosphere to generate a phosphor powder; hence, the above-described phosphor particle is quite effective in a variety of display fields of industry including PDP, since it has a spherical shape with less agglomeration and homogeneous distribution of manganese, an activator, thus proving superior to the conventional phosphor prepared by the solid state reaction method in terms of brightness.

9 Claims, 3 Drawing Sheets

[Figure 1]
(a)
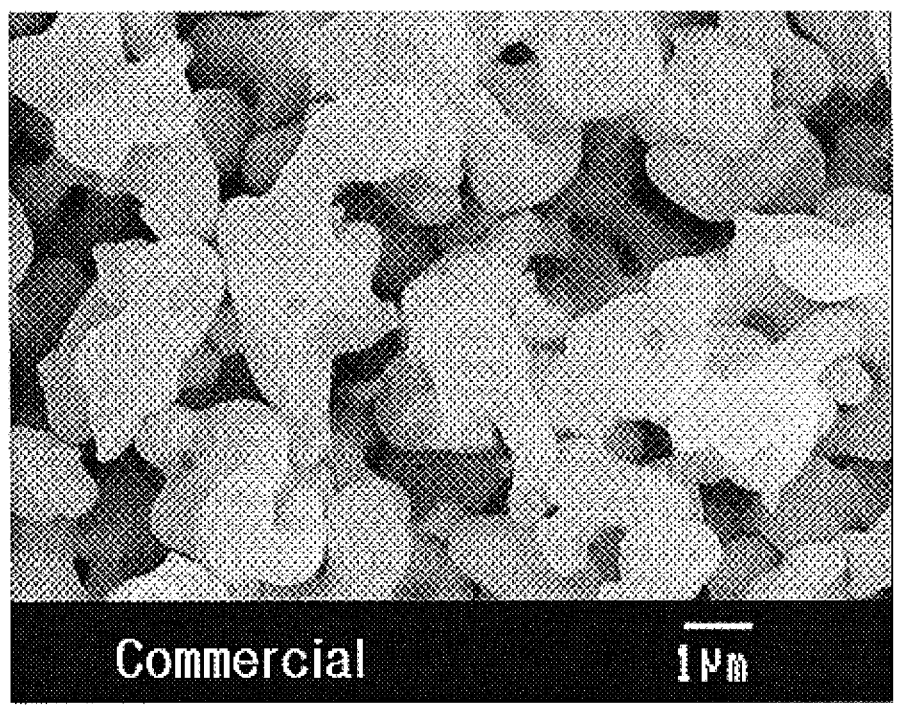
(b)
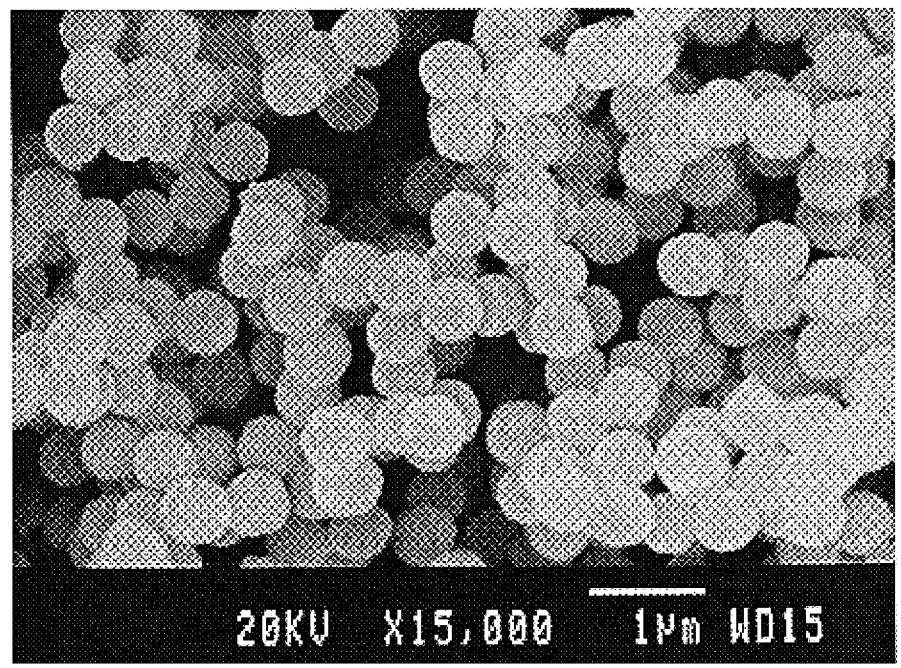

[Figure 2]
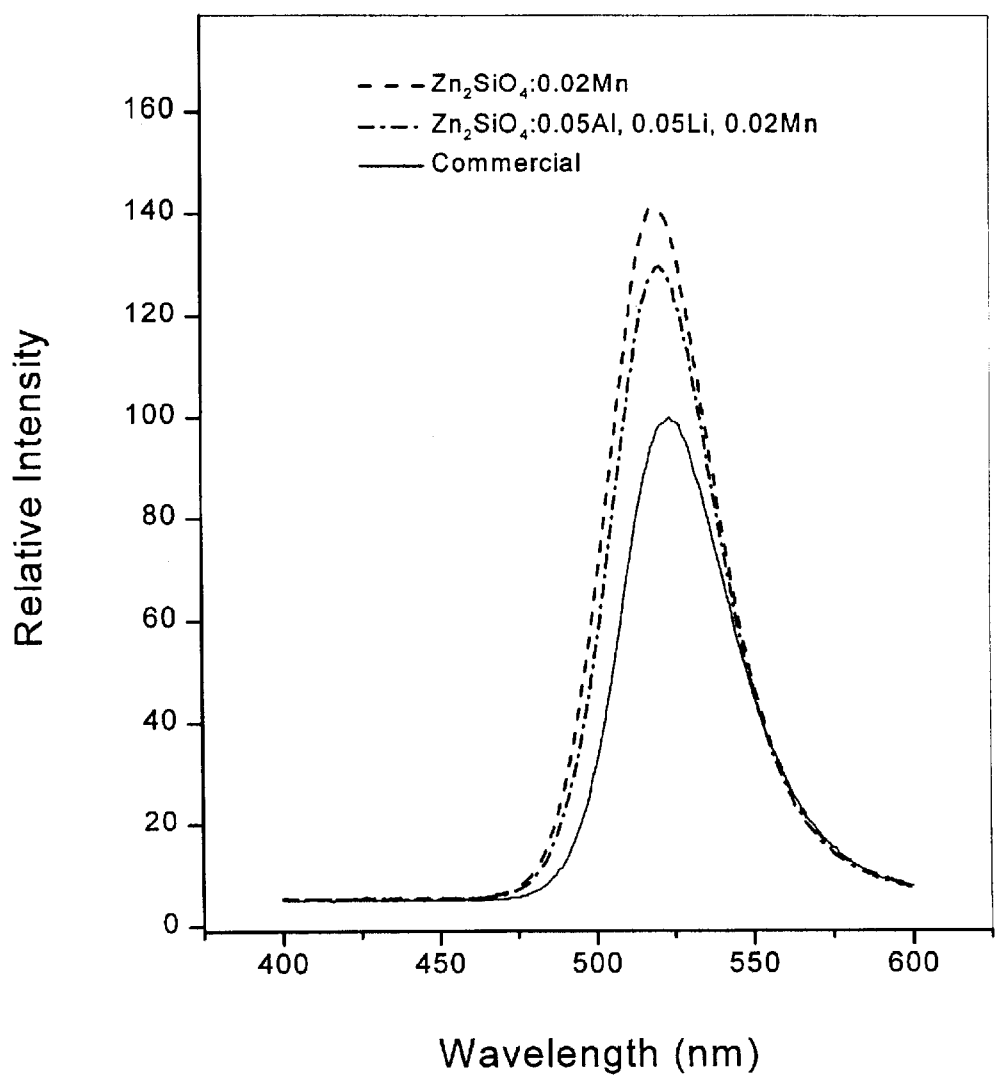

[Figure 3]
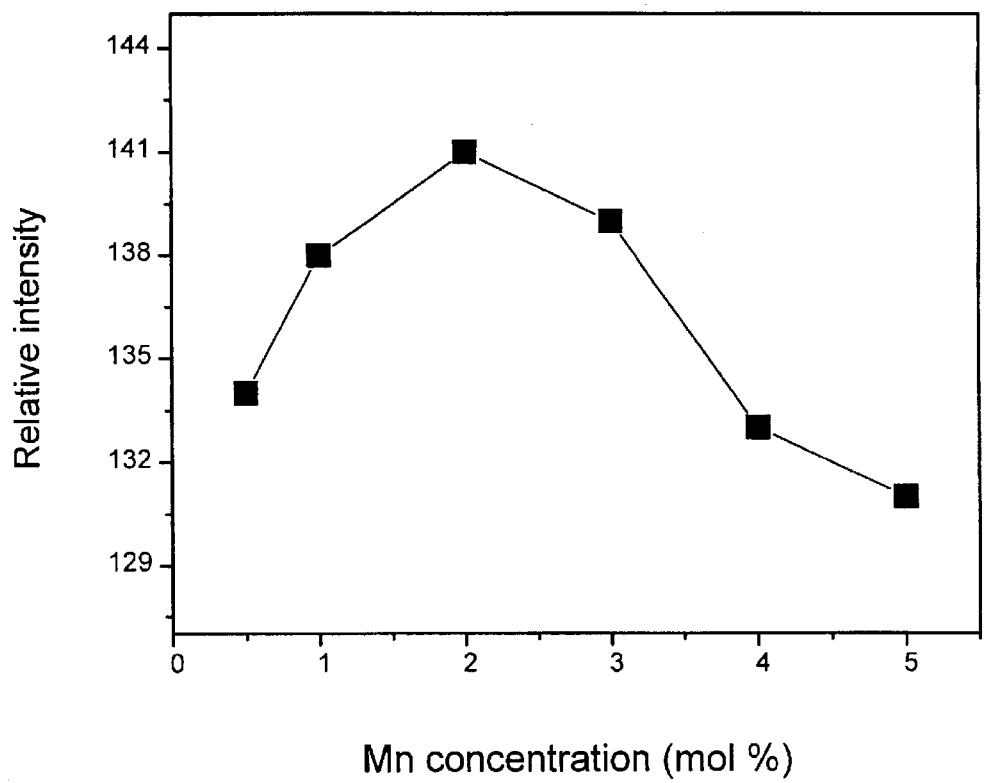

PREPARING GREEN PHOSPHOR BASED ON ZINC ORTHOSILICATE

FIELD OF THE INVENTION

This invention relates to a process for preparing a spherical green-emitting phosphor based on zinc orthosilicate and more particularly, to the process for a zinc orthosilicate-based green-emitting phosphor demonstrating an emission spectrum at visible regions, when excited by electron beam, via a new application of 'the homogeneous precipitation method' comprising the following steps such as i) a solution of tetraethylorthosilicate (TEOS) diluted in ethanol is hydrolyzed to obtain a hydrated silica, ii) said hydrated silica is dispersed together with the solution containing zinc and manganese components, iii) a precipitant selected from oxalic acid and oxalates is added to said dispersed solution together with a basic solution, while precipitating zinc and manganese components, iv) said admixture precipitate, so filtered off and dried, is calcined in the air and reheated under the reducing atmosphere to prepare a phosphor powder; hence, the above-described phosphor powder particle is quite effective in a variety of display industrial fields including PDP use, since it has a spherical shape with less agglomeration and uniform distribution of manganese, an activator, thus proving superior to the conventional phosphor prepared by the solid state reaction method in terms of brightness.

DESCRIPTION OF THE RELATED ART

Intensive researches have been focused on the green-emitting zinc orthosilicate-based phosphor used for the embodiment of various colors in the display industry. The typical Examples of such phosphor include a manganese-activated, green-emitting zinc orthosilicate phosphor having $Zn_2SiO_4$ as a matrix compound, while requiring $Mn^{2+}$ ion as an activator so as to replace $Zn^{2+}$.

Being known that the luminescent properties of phosphor are significantly dependent upon the particle size and the crystallinity, the exploitation for some novel matrix compounds, together with a novel synthetic method of phosphor, are under way in an effort to improve the luminescent properties of phosphor. The conventional method applied to prepare the zinc orthosilicate-based phosphor has been disclosed where the solid state reaction method conducted in a manner such that all starting solid materials are blended and heated for the manufacture of phosphor powder. According to the conventional method, however, the final calcination process should be performed at a very high temperature and this may result in the agglomeration of phosphor particles; if this is the case, the surface of phosphor may be damaged during the inevitably accompanied pulverizing process, or incorporation of impurities may function the formation of the dead layer on the surface of phosphor, thus resulting in the loss of emission intensity. For these reasons, other improved methods to replace the solid state reaction method are in urgent need. To comply with the above-described unfavorable situations, another solid state reaction technique was introduced using a flux to prepare the zinc orthosilicate-based phosphor, along with a co-precipitate process using sodium silicate or a sol-gel process. Nonetheless, these methods have failed to overcome the conventional drawbacks such as the non-uniform shape of phosphor particles and poor productivity. Meanwhile, to ensure a high-performance phosphor, it is a prerequisite that the size and the shape of phosphor particle and the homogeneous distribution of an activator in the parent lattice should be adjusted. With this in mind, there is an urgent need for the development of a novel synthetic process to prepare the zinc orthosilicate-based phosphor powder with uniform particles and good crystallinity.

SUMMARY OF THE INVENTION

Under such circumstances, the inventor et al. have conducted intensive studies to improve the luminescent properties of zinc orthosilicate-based phosphor through the synthesis of phosphor using a wet chemical process and noted that if the zinc orthosilicate-based phosphor is prepared via 'the homogeneous precipitation method', a green-emitting phosphor with the improved emission intensity can be prepared to have fine particles of uniform spherical shape. Therefore, an object of this invention is to provide a novel synthetic process for preparing a zinc orthosilicate-based green-emitting phosphor with better luminescent property through the introduction of a novel 'the homogeneous precipitation method', which has the following advantages compared with the conventional phosphor: (1) the particle size of phosphor powder is uniform and fine, (2) the phosphor powder has a spherical form with less agglomeration, and (3) the homogeneous distribution of an activator is ensured.

BRIEF DESCRIPTION OF THE DRAWINGS

FIG. 1a is a photograph in which the commercially available $Zn_2SiO_4$:Mn phosphor (Kasei Optonix Co., Japan) powder particles are observed under a scanning electron microscope; FIG. 1b is a photograph in which the $Zn_2SiO_4$: 0.02 Mn phosphor powder particles, so prepared by the Example 1 of this invention, are observed under a scanning electron microscope;

FIG. 2 is a drawing in which the emission spectra of $Zn_2SiO_4$:0.02Mn phosphor and $Zn_2SiO_4$:0.05Al, 0.05Li, 0.02 Mn phosphor, so prepared by Examples 2–3 of this invention, are compared with that of the commercially available $Zn_2SiO_4$:Mn phosphor (Kasei Optonix Co.); and, FIG. 3 shows the relative emission intensity observed according to the changes of manganese concentration in $Zn2SiO_4$:Mn phosphors, so prepared by the Examples 2 and 4–8 of this invention, when the emission intensity of commercially available $Zn_2SiO_4$:Mn phosphor, excited by a vacuum UV ray at 147 nm, is expressed as 100.

DETAILED DESCRIPTION OF THE INVENTION

This invention is characterized by a process for preparing a spherical green-emitting phosphor based on zinc orthosilicate via phosphor powder prepared using the homogeneous precipitation method.

This invention is explained in more detail as set forth hereunder. The zinc orthosilicate-based phosphor, so prepared by the above-described method of this invention, has the following advantages as (1) less agglomeration in the powder is observed with the form being uniform and spherical, (2) the homogeneous distribution of manganese, an activator, has contributed much to the achievement of extremely excellent green emission intensity at visible regions, when excited by an electron beam.

The process for preparing the manganese-activated zinc orthosilicate-based phosphor of this invention is explained in more detail as follows.

First, according to this invention, tetraethylorthosilicate (TEOS), a silicon compound is diluted in ethanol to prepare a TEOS solution; this solution is hydrolyzed by the addition of a base catalyst and water to convert the silicon components into the hydrated silica ($SiO_2 \cdot xH_2O$), followed by a filtering process. According to this invention, the process for obtaining the hydrated silica is performed in a manner such that to precipitate the silicon component in the TEOS solution, the diluted TEOS solution is hydrolyzed at the reaction temperature of 0–80° C. for 5 min–4 hours, followed by the filtering process. The concentration of the diluted TEOS solution used for this invention is in the range of 0.05–2 mol/L, preferably in the range of 0.1–1 mol/L. Further, ammonia water is preferred as a base catalyst for hydrolysis and the amount of a base catalyst with respect to TEOS ($NH_3$/TEOS) is preferred to be 1–20 in terms of the molar ratio. It is also preferred that the amount of water for hydrolysis of the TEOS ($H_2O$/TEOS) is in the range of 5–50 in terms of the molar ratio. If the concentration of TEOS solution and the amount of a base catalyst and water deviate the above predetermined level, some silicon components will be partially lost during the hydrolysis, thus resulting in the fluctuation of the phosphor composition and generation of non-uniform particle size and shapeless phosphor particle.

Then, the hydrated silica separated is dispersed in the solution containing zinc and manganese components. Hence, the solution containing zinc and manganese is prepared in a manner such that zinc and manganese compounds are dissolved in distilled water or acid solution; the concentration of aqueous solution containing zinc and manganese compounds according to the formula is in the range of 0.05–3 mol/L, preferably in the range of 0.1–2 mol/L. According to this invention, one or more zinc compounds can be selected from the group consisting of water-soluble zinc acetate, zinc chloride, zinc nitrate, zinc sulfate and zinc metal or zinc oxide which are dissolved in nitric acid, hydrochloric acid, acetic acid or sulfuric acid. Further, one or more manganese compounds can be selected from the group consisting of water-soluble manganese acetate, manganese chloride, manganese nitrate and manganese sulfate.

The next step corresponds to the important process of this invention; to precipitate the zinc and manganese components from the dispersed solution, one or more precipitants selected from oxalic acid and oxalates and then, for the adjustment of pH in the solution, a basic solution is further added as a pH modulator. Finally, the admixture precipitate of silicon, zinc and manganese is filtered off.

According to this invention, the appropriate amount of the precipitant is added in the equivalent ratio of 100–110% with respect to the total amount of zinc and manganese components contained in the solution; in fact, it is preferred that the concentration of oxalic acid or ammonium oxalate in solution is in the ratio of 0.1–2 mol/L. Further, the solution is adjusted to have a pH of 5–10 by the addition of a basic solution, preferably pH of 7–8 so as to perform the precipitate process without the loss of zinc and manganese components. In an effort to prevent the loss of zinc and manganese components, one or more basic solutions can be selected from the group consisting of inorganic bases such as sodium hydroxide and potassium hydroxide or organic amines such as diethylamine, diethanolamine and triethylamine.

According to this invention, a final step is that the admixture precipitate is dried and heat-treated in the air and under reducing atmosphere to obtain a $Zn_2SiO_4$:Mn phosphor. According to this invention, the solution of aluminum and lithium compounds from the selective drying process is additionally impregnated in the admixture precipitate to obtain a $Zn_2SiO_4$:Al, Li, Mn phosphor.

More specifically, each dried material is transferred to an alumina crucible, calcined in the air at 800–1,200° C. for 1–10 hrs; then, to reduce Mn components, an activator, each of the calcined materials is further reheated under a mild reducing atmosphere using a gas mixture such as $H_2/N_2$ or $CO/CO_2$ at 700–1,000° C. for 10 min–1 hr, thus obtaining a green-emitting phosphor based on manganese-activated zinc orthosilicate.

According to this invention, the reason to add the solution of aluminum and lithium compounds into the admixture precipitate at the selective drying process is to shorten the decay time of the phosphor. To this end, the Examples of aluminum and lithium compounds include aluminum nitrate and lithium nitrate, respectively; in particular, the concentrations of aluminum compound and lithium compound should be to 1–3 mol/L. According to this invention, the range of concentration is not specifically limited; nevertheless, if the concentrations of both compounds are too low, it requires longer drying time. By contrast, if the concentrations of both compounds are too high, said aluminum and lithium compounds cannot be completely dissolved thus preventing even impregnation of said compounds.

As such, the process for preparing a green-emitting phosphor based on manganese-activated zinc orthosilicate according to this invention is characterized by the design of 'the homogeneous precipitation method' unlike the conventional method, which has the following advantages: (1) the particle size of phosphor is uniform and fine, (2) spherical particle shape with less agglomeration may contribute much to the formation of high-density luminescent layer in the screen during the actual panel fabrication, thus enhancing the display performance, and (3) the homogeneous distribution of manganese, an activator, in the matrix compound can exhibit excellent green emission intensity.

The scanning electron microscope observation on phosphor powders, so prepared by a novel synthetic method of this invention, revealed that each phosphor powder has a uniform, fine particle of less than a micron with less agglomeration and uniformly spherical shape, as shown in FIG. 1; FIG. 2 indicates that the green emission spectrum centered at 520 nm detected when excited by a vacuum UV ray at 147 nm.

This invention is explained in more detail based on the following Examples but they should not be construed as limiting the scope of this invention.

EXAMPLE 1

18.7 g of TEOS was added to 350 mL of ethanol and was stirred for 1 hour to generate a TEOS/ethanol solution; then, the solution was hydrolyzed by the addition of 30% of ammonia water (60.3 g) at 40° C. for 2 hours so as to precipitate it as a hydrated silica. The precipitate, so filtered off and washed, was transferred to 170.5 mL of 1 mol/L zinc nitrate solution containing 0.00175 mol of manganese nitrate and was stirred vigorously for dispersion. 360 mL of 0.5 mol/L ammonium oxalate solution was slowly added to this suspension while stirring. By the addition of diethylamine, the pH of this suspension was adjusted to 7.5 and stirred for 1 hour to form an admixture precipitate containing silicon, zinc and manganese. The admixture precipitate was filtered off, washed and dried at 80° C. for 4 hours. The dried precipitate was placed in alumina crucible and calcined in the air at 1050° C. for 2 hours. The calcined material, so obtained, was reheated under the reducing atmosphere of 5% $H_2/N_2$ gas mixture at 900° C. for 30 min to obtain a desired phosphor powder.

The chemical composition of the phosphor, so obtained, was $Zn_{1.98}Mn_{0.02}SiO_4$. FIG. 1a is a photograph of the commercially available powder particles of $Zn_2SiO_4$:Mn phosphor (Kasei Optonix Co., Japan) observed under a scanning electron microscope; FIG. 1b is a photograph of powder particles of the $Zn_2SiO_4$:0.02 Mn phosphor, so prepared as in Example 1 of this invention, are observed by a scanning electron microscope. From the observation results of scanning electron microscope on $Zn_2SiO_4$:0.02Mn phosphor powders, so prepared by the heat treatment of 1050° C. and 800° C., respectively, in the air and under the reducing atmosphere from the final heat-treatment step according to a novel synthetic method of this invention, it was revealed that compared with the commercially available phosphor, each phosphor powder of this invention has a uniform, fine particle of less than one micron with less agglomeration and a spherical form, as shown in FIG. 1.

EXAMPLE 2

18.7 g of TEOS was added to 140 mL of ethanol and stirred for 1 hour to generate a TEOS/ethanol solution; then, the solution was hydrolyzed by the addition of 30% of ammonia water (12.6 g) and 14 g of distilled water at 70 for 1 hour so as to precipitate it as a hydrated silica. The precipitate, so filtered off and washed, was transferred to 170.5 mL of 1 mol/L zinc nitrate solution containing 0.00175 mol of manganese nitrate and stirred vigorously for dispersion. 360 mL of 0.5 mol/L ammonium oxalate solution was slowly added to this slurry solution while stirring. By the addition of 50% diethylamine, the pH of this suspension was adjusted to 8 and stirred for 1 hour to form an admixture precipitate containing silicon, zinc and manganese. Hereinafter, the desired phosphor powder was obtained in the same procedure as in Example 1.

The shape of phosphor powder particles, so obtained, had the same spherical form as in FIG. 1b; also, the phosphor powder demonstrated the same green emission spectrum centered at 520 nm when excited by vacuum UV ray at 147 nm, as in FIG. 2.

EXAMPLE 3

In the same manner as in Example 2, the reaction was performed with an exception that the admixture precipitate of silicon, zinc and manganese formed from 162 mL of 1 mol/L zinc nitrate solution containing 0.00175 mol of manganese nitrate was filtered off; then, the 2.2 mL of 2 mol/L solution containing aluminum and lithium nitrate was impregnated into the admixture precipitate and dried. Hereinafter, the desired phosphor powder was obtained in the same procedure as in Example 1.

The chemical composition of the phosphor, so obtained, was $Zn_{1.88}Al_{0.05}Li_{00.5}Mn_{0.02}SiO_4$. The shape of phosphor powder particles, so obtained, was the same spherical form as FIG. 1b; also, the phosphor powder particles demonstrated the same green emission spectrum centered at 520 nm when excited by vacuum UV ray at 147 nm, as in FIG. 2.

EXAMPLE 4–8

To obtain the phosphors described in the following table 1, the reaction was performed in the same procedure as in Example 2. The test results were shown in the following table 1: a) emission intensity of phosphors measured when excited by vacuum UV ray at 147 nm and decay time ($t_{10\%}$:time consumed to reach 10% emission intensity with respect to an initial emission intensity) in comparison with the commercially available phosphor.

TABLE 1

| Category | | Composition of Phosphor Material | Relative Emission Intensity | Decay Time(ms) | Particle Shape |
|---|---|---|---|---|---|
| Examples | 1 | $Zn_{1.98}Mn_{0.02}SiO_4$ | 141 | 23 | spherical |
| | 2 | $Zn_{1.98}Mn_{0.02}SiO_4$ | 140 | 23 | spherical |
| | 3 | $Zn_{1.88}Al_{0.05}Li_{0.05}Mn_{0.02}SiO_4$ | 130 | 8 | spherical |
| | 4 | $Zn_{1.995}Mn_{0.005}SiO_4$ | 134 | 29 | spherical |
| | 5 | $Zn_{1.97}Mn_{0.01}SiO_4$ | 138 | 27 | spherical |
| | 6 | $Zn_{1.97}Mn_{0.03}SiO_4$ | 139 | 19 | spherical |
| | 7 | $Zn_{1.98}Mn_{0.04}SiO_4$ | 133 | 15 | spherical |
| | 8 | $Zn_{1.95}Mn_{0.05}SiO_4$ | 131 | 11 | spherical |
| Commercially Available[1] | | $Zn_2SiO_4$ | 100 | 6 | — |

Note:
[1]Commercially Available $Zn_2SiO_4$: Mn phosphor(Kasei Optonix Co., Japan)

From the above table 1, it was revealed that when these phosphors, so prepared by Example 1–8 of this invention were compared with the commercially available manganese-activated zinc orthosilicate phosphor, the former had better green emission intensities with uniform particle size and spherical particle shape.

As described above, FIG. 2 is a drawing in which the emission intensities of $Zn_2SiO_4$:Mn and $Zn_2SiO_4$:Al, Li, Mn phosphors, so prepared by Examples of this invention, are compared with that of the commercially available green phosphor for PDP (Kasei Optonix Co.), when excited by vacuum UV ray at 147 nm. From the above FIG. 2, it was revealed that these phosphors of this invention demonstrated better green brightness having the emission spectra centered at around 520 nm of specific $Mn^{2+}$ ions, in comparison with the commercially available phosphors. It is speculated that the excellent luminescent properties of this invention based on the homogeneous precipitation method may be ascribed to the fact that these phosphors have uniform particle size and spherical shape and on top of that, manganese, an activator, is homogeneously distributed in the matrix compound.

Unlike the conventional art, a novel synthetic process for preparing zinc orthosilicate-based phosphor according to this invention is characterized in that the above-described phosphor powder particle is quite effective in a variety of display industrial fields including PDP use, since it has a spherical shape with less agglomeration and homogeneous distribution of manganese, an activator, thus proving superior to the conventional phosphors prepared by the solid state reaction method in terms of brightness.

What is claimed is:

1. A process for preparing a green-emitting phosphor based on zinc orthosilicate, wherein it comprises the following steps:

a base catalyst and water are added to a TEOS/ethanol solution to obtain hydrated silica via hydrolysis;

said hydrated silica, so filtered off, is dispersed together with a solution containing zinc and manganese;

a precipitant selected from oxalic acid and oxalate salts is added to said dispersed solution, together with a basic solution for adjustment of pH, whereby the pH of said dispersed solution is adjusted to 5–10 while precipitating zinc and manganese components; and said admixture precipitate, so filtered off and dried, is calcined in the air and reheated under the reducing atmosphere to generate a phosphor powder.

2. The process for preparing a zinc orthosilicate-based green-emitting phosphor according to claim 1, wherein the concentration of TEOS/ethanol solution is in the range of 0.05–2 mol/L.

3. The process for preparing a zinc orthosilicate-based green-emitting phosphor according to claim 1, wherein the concentration of said solution containing zinc and manganese components is in the range of 0.05–3 mol/L.

4. The process for preparing a zinc orthosilicate-based green-emitting phosphor according to claim 1, wherein one or more basic solutions for adjustment of pH comprise aqueous solutions of inorganic bases.

5. The process for preparing a zinc orthosilicate-based green-emitting phosphor according to claim 4, wherein one or more basic solutions for adjustment of pH consists essentially of sodium hydroxide or potassium hydroxide.

6. The process for preparing a zinc orthosilicate-based green-emitting phosphor according to claim 1, wherein one or more basic solutions for adjustment of pH consists essentially of organic amines.

7. The process for preparing a zinc orthosilicate-based green-emitting phosphor according to claim 6, wherein said organic amines consist essentially of diethylamine, diethanolamine, or triethylamine.

8. The process for preparing a zinc orthosilicate-based green-emitting phosphor according to claim 1, wherein an additional step of impregnating the aluminum and lithium compounds into the admixture precipitate is further performed during said drying process.

9. The process for preparing a zinc orthosilicate-based green-emitting phosphor according to claim 8, wherein said aluminum and lithium compounds are the admixture solution containing aluminum nitrate and lithium nitrate having 1–3 mol/L, respectively.

* * * * *